(12) United States Patent
Leleannec et al.

(10) Patent No.: US 11,677,976 B2
(45) Date of Patent: Jun. 13, 2023

(54) METHOD AND APPARATUS FOR VIDEO ENCODING AND DECODING USING BI-PREDICTION

(71) Applicant: InterDigital VC Holdings, Inc., Wilmington, DE (US)

(72) Inventors: Fabrice Leleannec, Mouaze (FR); Tangi Poirier, Thorigne-Fouillard (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/277,953

(22) PCT Filed: Sep. 18, 2019

(86) PCT No.: PCT/US2019/051653
§ 371 (c)(1),
(2) Date: Mar. 19, 2021

(87) PCT Pub. No.: WO2020/061147
PCT Pub. Date: Mar. 26, 2020

(65) Prior Publication Data
US 2021/0352320 A1    Nov. 11, 2021

(30) Foreign Application Priority Data
Sep. 21, 2018    (EP) .................................... 18306231

(51) Int. Cl.
*H04N 19/577*    (2014.01)
*H04N 19/105*    (2014.01)
(Continued)

(52) U.S. Cl.
CPC ......... *H04N 19/577* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

| | | | |
|---|---|---|---|
| 2015/0098503 A1* | 4/2015 | Pu .......................... | H04N 19/50 375/240.12 |
| 2016/0255359 A1* | 9/2016 | Yu ......................... | H04N 19/176 375/240.15 |
| 2017/0034525 A1* | 2/2017 | Sato ...................... | H04N 19/172 |

OTHER PUBLICATIONS

Anonymous, "Series H: Audiovisual and Multimedia Systems—Infrastructure of audiovisual services—Coding of moving video: Reference software for ITU-T H.265 high efficiency video coding", International Telecommunication Union, Recommendation ITU-T H.265.2, Oct. 2014, 12 pages.
(Continued)

*Primary Examiner* — Michael J Hess
(74) *Attorney, Agent, or Firm* — Condo Roccia Koptiw LLP

(57) ABSTRACT

Different implementations are described, particularly implementations for video encoding and decoding using motion compensation with bi-prediction are presented. The encoding method comprises for a picture, obtaining a first predictor for a block of the picture using a first reference picture; obtaining a second predictor for said block of the picture using a second reference picture; using the first predictor and the second predictor for forming a third predictor for the block in bi-prediction inter prediction, wherein the third predictor is obtained as a weighted average of the first predictor and the second predictor; and wherein a weight used in the weighed prediction depend on the position of the sample in the block. Others embodiments are presented for implementing block triangle partition prediction, for imple-
(Continued)

menting block partition prediction using multiple patterns and for corresponding motion compensation in decoding method.

26 Claims, 9 Drawing Sheets

(51) Int. Cl.
  *H04N 19/119* (2014.01)
  *H04N 19/176* (2014.01)
  *H04N 19/182* (2014.01)
  *H04N 19/186* (2014.01)
(52) U.S. Cl.
  CPC ......... *H04N 19/176* (2014.11); *H04N 19/182* (2014.11); *H04N 19/186* (2014.11)

(56) References Cited

OTHER PUBLICATIONS

Liao et al., "CE10-related: Simplification of triangular prediction unit mode", Joint Video Experts Team (JVET) of ITU-T SG16 WP3 and ISO/IEC JTC 1/SC 29/WG11, Document: JVET-M0317-r3, 13th Meeting: Marrakech, Morocco, Jan. 9, 2019, 6 pages.
Hsu et al, "Description of Core Experiment 10: Combine and multi-hypothesis prediction", Joint Video Experts Team (JVET) of ITU-T SG 16 WP3 and ISO/IEC JTC 1/SC 29/WG 11, Document JVET-K1030_v2, 11th Meeting: Ljubljana, Slovenia, Jul. 10, 2018, 12 pages.
Chen et al., "Algorithm Description for Versatile Video Coding and Test Model 1 (VTM 1)", Joint Video Experts Team (JVET) of ITU-T SG 16 WP 3 and ISO/IEC JTC 1/SC 29/WG 11, Document JVET-J1002-v1, 10th Meeting: San Diego, California, United States, Apr. 10, 2018, 7 pages.
Liao et al, "CE10.3.1.b: Triangular prediction unit mode", Joint Video Exploration Team (JVET) of ITU-T SG16 WP3 and ISO/IEC JTC 1/SC 29WG11, Document: JVET-L0124-v2, 12 Meeting: Macao, China, Oct. 3, 2018, 8 pages.
Toma et al, "Description of SDR video coding technology proposal by Panasonic", Joint Video Experts Team (JVET) of ITU-T SG16 WP3 and ISO/IEC JTC 1/SC 29/WG 11, Document: JVET-J0020-v1, 10th Meeting: San Diego, California, USA, Apr. 10, 2018, 75 pages.
Liao et al, "CE10:Triangular prediction unit mode (CE10.3.1 and CE10.3.2)", Joint Video Exploration Team (JVET) of ITU-T SG 16 WP 3 and ISO/IEC JTC 1/SC 29/WG 11, Document: JVET-K0144-v2, 11th Meeting: Ljubljana, Slovenia, Jul. 10, 2018, 6 pages.
Ahn et al, "CE10-related: Diagonal motion partitions on top of MTT block structure", Joint Video Experts Team (JVET) of ITU-T SG16 WP3 and ISO/IEC JTC 1/SC 29/WG11, Document: JVET-K0270, 11th Meeting: Ljubljana, Slovenia, Jul. 10, 2018, 9 pages.
Chen et al, "CE10-related: Simplified Triangle Prediction Unit Mode", Joint Video Experts Team (JVET) of ITU-T SG 16 WP 3 and ISO/IEC JTC 1/SC 29/WG1 1, Document: JVET-M0328_v4, 13th Meeting: Marrakech, Morocco, Jan. 9, 2019, 8 pages.
Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.
Anonymous, "Information Technology—Generic Coding of Moving Pictures and Associated Audio Information: Video", International Organization for Standardization (ISO) and the International Electrotechnical Commission (IEC), Recommendation ITU-T H.262, Document ISO 13818-2: 1995 (E), 1995, 255 pages.
Chen et al, "Generalized Bi-Prediction for Inter Coding", Joint Video Exploration Team (JVET) of ITU-T SG 16 WP 3 and ISO/IEC JTC 1/SC 29/WG 11, Document: JVET-C0047, 3rd Meeting: Geneva, Switzerland, May 26, 2016, 4 pages.

\* cited by examiner

METHOD AND APPARATUS FOR VIDEO ENCODING AND DECODING USING BI-PREDICTION

CROSS REFERENCE TO RELATED APPLICATIONS

This application is the national stage entry under 35 U.S.C. § 371 of International Application PCT/US2019/051653, filed Sep. 18, 2019, which was published in accordance with PCT Article 21(2) on Mar. 26, 2020, in English, and which claims the benefit of European Patent Application No. 18306231.4, filed Sep. 21, 2018.

TECHNICAL FIELD

A method and an apparatus for encoding a video into a bitstream are disclosed. A corresponding decoding method and apparatus are further disclosed. At least some embodiments further relate to the bi-prediction for inter coded blocks in a video compression scheme.

BACKGROUND

The technical field of the one or more implementations is generally related to video compression. To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction. In the HEVC video compression standard, also known as recommendation ITU-T H.265, the bi-prediction process used in inter prediction comprises the averaging of 2 uni-directional prediction signals. FIG. 1 illustrates the bi-prediction process in HEVC. The averaging of the 2 uni-directional prediction is done at a higher precision than either the input bitdepth or internal bitdepth as shown in FIG. 1. The bi-prediction formula is shown in Equation 1, where offset and shift are used to normalize the final predictor to input bit-depth:

$$P_{bidir}=(P_{L0}+P_{L1}+\text{offset})\text{>>shift} \qquad \text{Equation 1}$$

As there is no rounding in intermediate stages, HEVC interpolation filter allows certain implementation optimizations.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard. For instance, in more recent approach of video codec, multiple weights are used for averaging 2 uni-directional prediction to get a bi-directional prediction. Typically, the weights used are {−1/4, 5/4}, {3/8, 5/8} or {1/2, 1/2} ({1/2, 1/2} being the one implemented in HEVC), and the bi-prediction formula is modified as in Equation 2. Only one weight is used for the entire block.

$$P_{bidir}=((1-w_1)*P_{L0}+w_1*P_{L1}+\text{offset})\text{>>shift} \qquad \text{Equation 2}$$

In another approach of video codec, triangular prediction is used in merge mode. FIG. 2 illustrates the splitting of a coding unit CU into two triangular prediction units. As shown in FIG. 2, a CU is split into two triangular prediction units PU0 and PU1, either in diagonal or inverse diagonal direction along a diagonal edge. Each triangular prediction unit in the CU is inter-predicted using its own motion vectors and reference frame index which are derived from a merge candidate list. In this context, an adaptive weighting process is applied to the diagonal or inverse diagonal edge between the two triangular prediction units to derive the final prediction for the whole CU. FIG. 3 illustrates such weighting process on the diagonal edge between the two triangular prediction units. The triangular prediction unit mode is only applied to CUs in skip or merge mode. When the triangular prediction unit mode is applied to the CU, an index indicating the direction of splitting the CU into two triangular prediction units and the motion vectors of the two triangular prediction units are signaled. A common list of 5 uni-directional predictors is derived for both Prediction Units, same spatial and temporal positions are checked than in classical merge process but only uni-directional vectors are used. Redundant motion vectors are not added to the list and zero motion vectors are added at the end of the list if there is not enough candidates. The number of motion vector predictor is 5 for a given prediction unit, 20 combinations are tested for each diagonal (5*4=20, the same motion vector predictor cannot be used for both PUs). The index ranges from 0 to 39 and a look-up table, see Table 2, is used for deriving splitting direction and motion vectors for each PU from the index. The first element of a given triplet gives the diagonal direction, the second and third elements give respectively the predictor index for PU0 and PU1 respectively. The index syntax is shown in Table 1.

TABLE 1

Triangle partitions and corresponding merge index syntax

|  | Descriptor |
|---|---|
| prediction_unit( x0, y0, nPbW, nPbH ) { <br>   if( cu_skip_flag[ x0 ][ y0 ] ) { <br>     triangle_flag[ x0 ][ y0] <br>   if( MaxNumMergeCand > 1 ) { <br>     if( triangle_flag[ x0 ][ y0] ) { <br>       triangle_merge_data( x0, y0, nPbW, nPbH) <br>     } else { <br>       merge_idx[ x0 ][ y0 ] <br>     } <br>   } <br> } else { /* MODE_INTER */ |  <br>  <br>  <br>  <br>  <br> ae(v) |

TABLE 1-continued

Triangle partitions and corresponding merge index syntax

| | Descriptor |
|---|---|
| merge_flag[ x0 ][ y0 ] | ae(v) |
| if( merge_flag[ x0 ][ y0 ] ) { | |
|   if( MaxNumMergeCand > 1 ) { | |
|     if( triangle_flag[ x0 ][ y0] ) { | |
|       triangle_merge_data( x0, y0, nPbW, nPbH) | |
|     } else { | |
|       merge_idx[ x0 ][ y0 ] | ae(v) |
|     } | |
|   } | |
| } | |
| } | |
| triangle_merge_data( x0, y0, nPbW, nPbH) { | |
|   most_probable_idx[ x0 ][ y0 ] | u(1) |
|   if( most_probable_idx[ x0 ][ y0 ] ) { | |
|     zero_or_one_idx[ x0 ][ y0 ] | u(1) |
|   } else { | |
|     remaining_idx[ x0 ][ y0 ] | se(v) |
|   } | |
| } | |

TABLE 2

Look-up table to determine diagonal direction and predictors

```
const uint8_t g_TriangleCombination[TRIANGLE_MAX_NUM_CANDS][3] =
{
  { 0, 1, 0 }, { 1, 0, 1 }, { 1, 0, 2 }, { 0, 0, 1 }, { 0, 2, 0 },
  { 1, 0, 3 }, { 1, 0, 4 }, { 1, 1, 0 }, { 0, 3, 0 }, { 0, 4, 0 },
  { 0, 0, 2 }, { 0, 1, 2 }, { 1, 1, 2 }, { 0, 0, 4 }, { 0, 0, 3 },
  { 0, 1, 3 }, { 0, 1, 4 }, { 1, 1, 4 }, { 1, 1, 3 }, { 1, 2, 1 },
  { 1, 2, 0 }, { 0, 2, 1 }, { 0, 4, 3 }, { 1, 3, 0 }, { 1, 3, 2 },
  { 1, 3, 4 }, { 1, 4, 0 }, { 1, 3, 1 }, { 1, 2, 3 }, { 1, 4, 1 },
  { 0, 4, 1 }, { 0, 2, 3 }, { 1, 4, 2 }, { 0, 3, 2 }, { 1, 4, 3 },
  { 0, 3, 1 }, { 0, 2, 4 }, { 1, 2, 4 }, { 0, 4, 2 }, { 0, 3, 4 },
}
```

FIG. 4 illustrates sub-block motion vector storage for triangle partitions according to a particular compression scheme. In an implementation, motion vectors are stored for each 4×4 sub-blocks. When Triangle partitions are used for a CU, the motion vectors used for each partition are stored in the same manner for each sub-blocks, but for sub-blocks on the edge, only the motion vector from one PU is stored, as shown in FIG. 4.

The bi-prediction of inter coded blocks in combination with triangular partitions raises implementation issues. A less computational method for bi-prediction is therefore desirable. Accordingly, several embodiments are disclosed to improve bi-prediction of inter coded blocks.

SUMMARY

According to an aspect of the present disclosure, a method for encoding a picture is disclosed. Such a method comprises obtaining a first predictor for a block of the picture using a first reference picture; obtaining a second predictor for the block of the picture using a second reference picture; using the first predictor and the second predictor for forming a third predictor for the block of the picture in bi-prediction inter prediction, wherein the third predictor is obtained as a weighted average of the first predictor and the second predictor; and wherein a sample of the third predictor is obtained by applying a first weight to a sample of the first predictor and by applying a second weight to a sample of the second predictor; the sample of the third predictor, the sample of the first predictor and the sample of the second predictor sharing a same position in the block; and the first weight and the second weight depending on the position of the sample in the block.

According to another aspect of the present disclosure, an apparatus for encoding a picture is disclosed. Such an apparatus comprises means for obtaining a first predictor for a block of the picture using a first reference picture; means for obtaining a second predictor for the block of the picture using a second reference picture; means for forming a third predictor for the block of the picture in bi-prediction inter prediction using the first predictor and the second predictor, wherein the third predictor is obtained as a weighted average of the first predictor and the second predictor; and wherein a sample of the third predictor is obtained by applying a first weight to a sample of the first predictor and by applying a second weight to a sample of the second predictor; the sample of the third predictor, the sample of the first predictor and the sample of the second predictor sharing a same position in the block; and the first weight and the second weight depending on the position of the sample in the block.

According to an aspect of the present disclosure, an apparatus for encoding a picture is provided, the apparatus including a processor, and at least one memory coupled to the processor, the processor being configured to implement any variants of the encoding the method.

According to another aspect of the present disclosure, a method for decoding a video is disclosed. Such a method comprises receiving in a bitstream coded video data and for motion compensation, obtaining a first predictor for a block of the picture using a first reference picture; obtaining a second predictor for the block of the picture using a second reference picture; using the first predictor and the second predictor for forming a third predictor for the block of the picture in bi-prediction inter prediction, wherein the third predictor is obtained as a weighted average of the first predictor and the second predictor; and wherein a sample of the third predictor is obtained by applying a first weight to a sample of the first predictor and by applying a second weight to a sample of the second predictor; the sample of the third predictor, the sample of the first predictor and the sample of the second predictor sharing a same position in the block; and wherein the first weight and the second weight depend on the position of the sample in the block.

According to another aspect of the present disclosure, an apparatus for decoding a video is disclosed. Such an apparatus comprises means for receiving in a bitstream coded video data and means for processing motion compensation, said means for processing motion compensation further comprising means for obtaining a first predictor for the block of a picture using a first reference picture; means for obtaining a second predictor for the block of the picture using a second reference picture; means for forming a third predictor for the block of the picture in bi-prediction inter prediction using the first predictor and the second predictor, wherein the third predictor is obtained as a weighted average of the first predictor and the second predictor; wherein a sample of the third predictor is obtained by applying a first weight to a sample of the first predictor and by applying a second weight to a sample of the second predictor; the sample of the third predictor, the sample of the first predictor and the sample of the second predictor sharing a same position in the block; and wherein the first weight and the second weight depend on the position of the sample in the block.

According to an aspect of the present disclosure, an apparatus for decoding a video is provided, the apparatus including a processor, and at least one memory coupled to the processor, the processor being configured to receive in a bitstream coded video data and to implement any variants of the decoding the method.

The present disclosure also provides a signal comprising video data generated according to the method or the apparatus of any of the preceding descriptions. The present embodiments also provide a computer program product including instructions, which, when executed by a computer, cause the computer to carry out the methods described.

The present disclosure also provides a computer readable storage medium having stored thereon a bitstream generated according to the methods described above. The present disclosure also provides a method and apparatus for transmitting the bitstream generated according to the methods described above.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of a picture. They may be applied to encode/decode a part of picture, such as a slice or a tile, or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to method for video encoding or video decoding comprising weighted bi-prediction wherein the weights of the weighted bi-prediction are dependent on the position of the sample in the block of a picture of the encoded or decoded video.

Figures 3, 4:
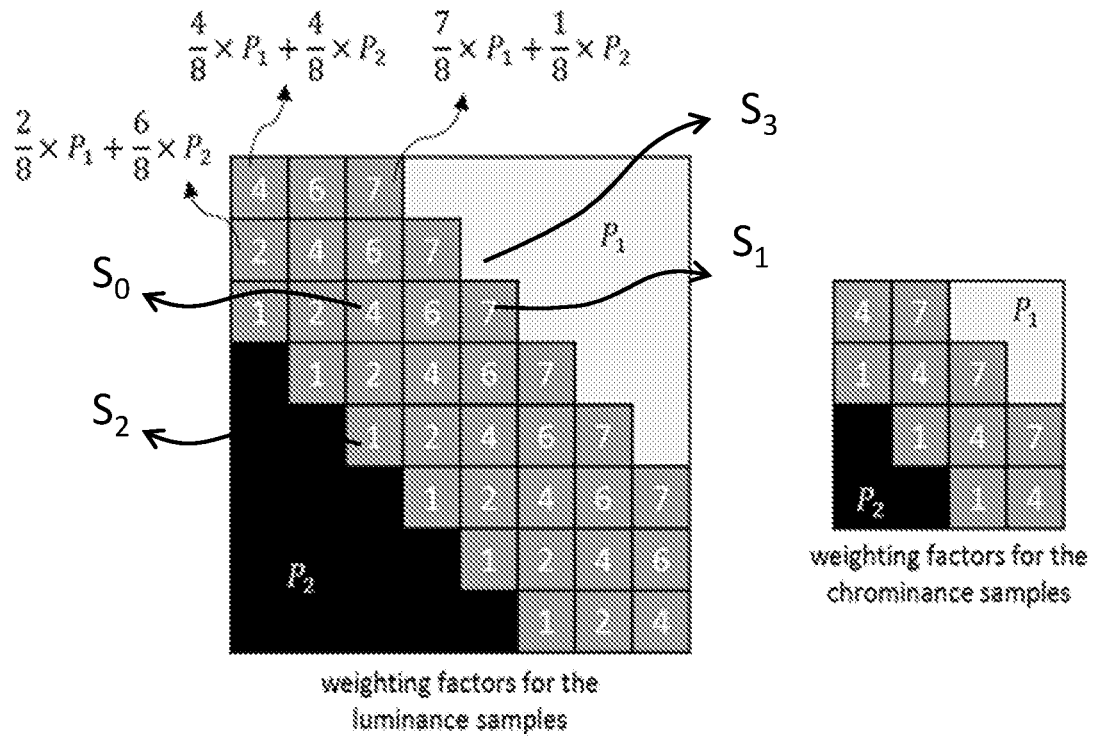
FIG. 3 illustrates weighting process on the diagonal edge between the two triangular prediction units according to a particular compression scheme.
FIG. 4 illustrates sub-block motion vector storage for triangle partitions according to a particular compression scheme.
Figure 5:
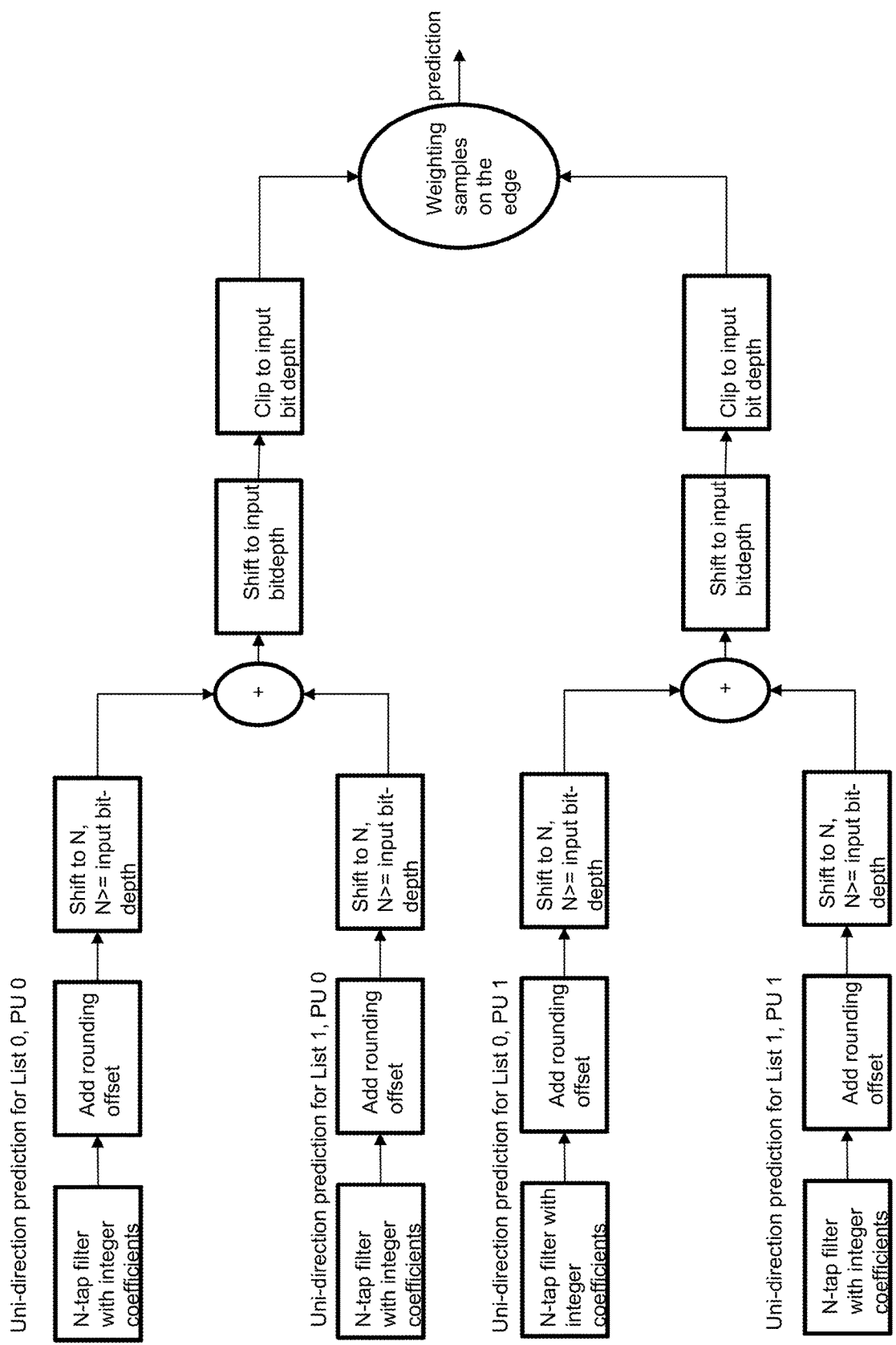
FIG. 5 illustrates the motion compensation process for bi-predicted triangular partitions according to a particular compression scheme.

A first problem of weighted motion compensation for bi-predicted triangular partitions, is that each PU is bi-predicted, thus involving a weighting process on the edge between the 2 predictions. FIG. 5 illustrates the motion compensation process for bi-predicted triangular partitions. For the samples on the edge as illustrated on FIG. 3, 4 motion compensations are needed as shown in FIG. 5. A less computational method is therefore desirable.

Figure 6:
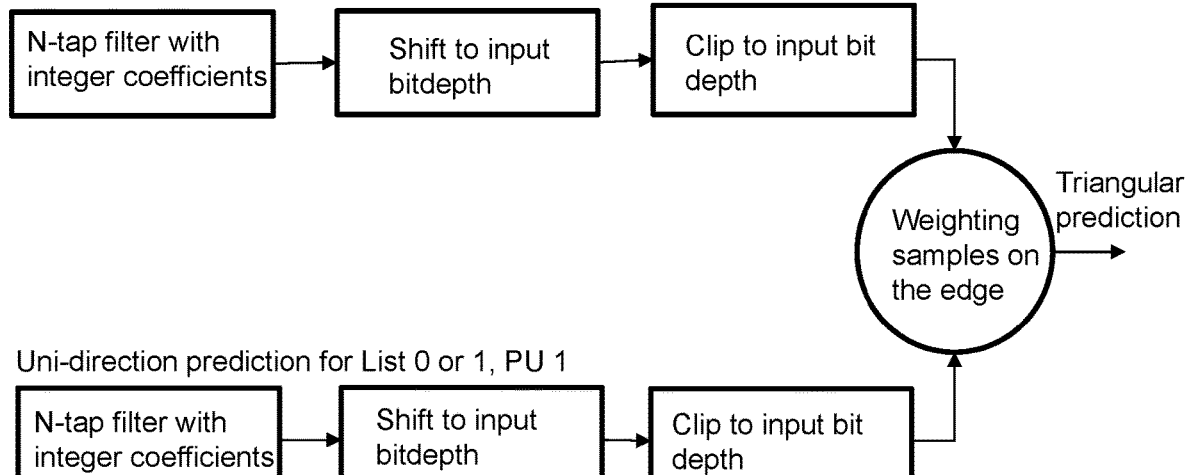
FIG. 6 illustrates the motion compensation process for uni-predicted triangular partitions according to a particular compression scheme.

A first solution has been proposed that restricts triangular PU to uni-prediction to decrease the memory bandwidth. FIG. 6 illustrates the motion compensation process for uni-predicted triangular partitions. In this case, the motion compensation process is simplified as shown in FIG. 6. However, this solution can still benefit from improvement regarding the precision of the process. At least one embodiment relates to improving the precision of the bi-prediction process of inter coded blocks.

In an enhancement of bi-predicted triangular partitions, it is desirable to improve the compression efficiency by adding more patterns. Then, a second problem of weighted motion compensation for bi-predicted partitions is to signal the added patterns without having a large cost of coding the index of the combination of partitions and motion vectors. At least one embodiment relates to improving the signaling of the bi-prediction process of inter coded blocks.

A third problem is the storage of the motion vectors used for each PU in the subblocks on the edge. For the sample on the edge, a weighting is done between the 2 predictions, this means that at least 2 motion vectors are used to predict this sample, but in memory only the motion vector used to predict the current PU is stored, this may lead to suboptimal motion propagation with the neighboring blocks. At least one embodiment relates to improving the storage of motion vectors for the bi-prediction process of inter coded blocks.

Accordingly, several embodiments are disclosed to improve de bi-prediction of inter coded blocks.

Generic Embodiment

Figure 15:
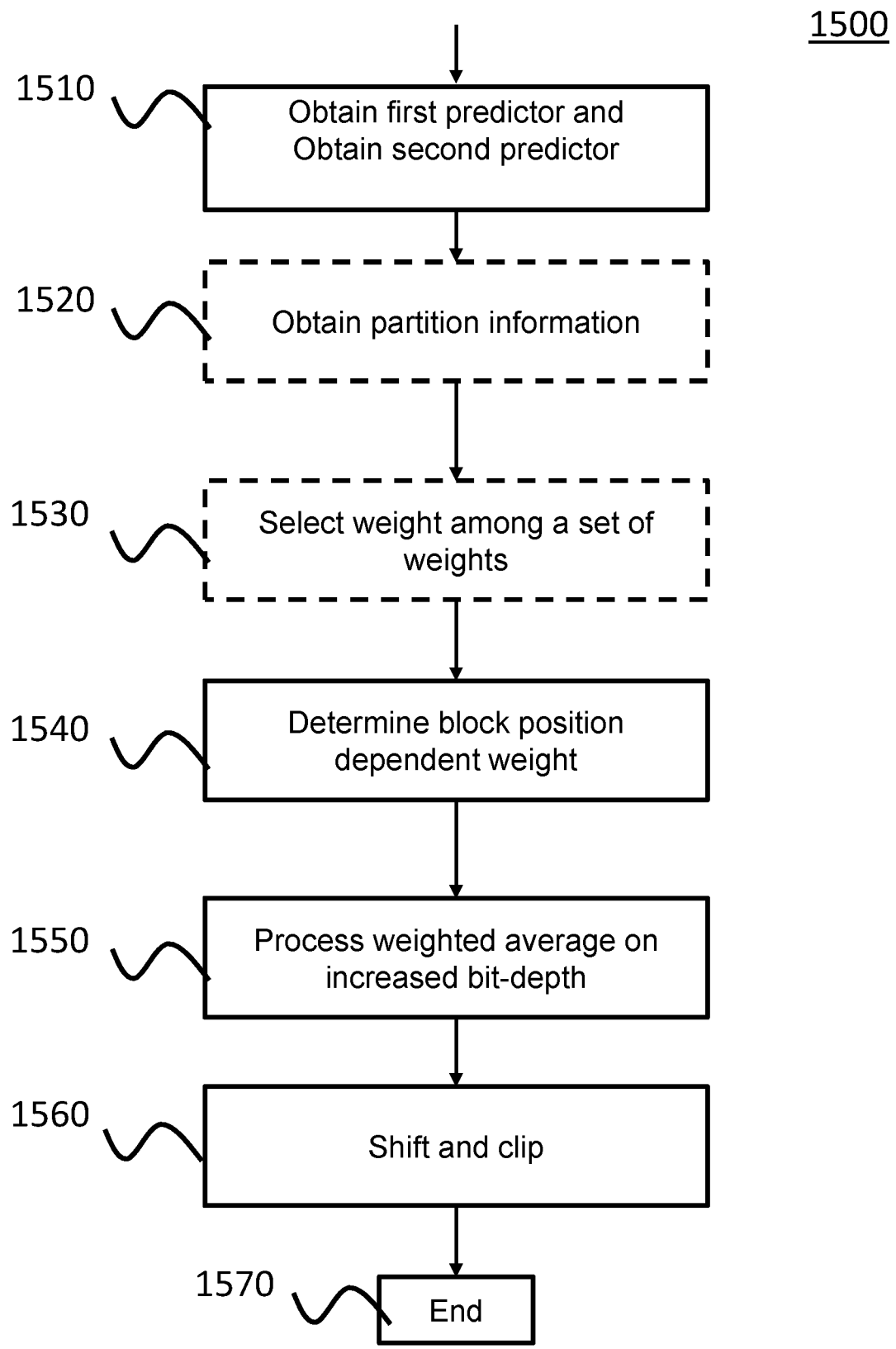
FIG. 15 illustrates a weighting bi prediction implemented in any of a decoding method or encoding method according to an embodiment of the present disclosure.

At least one embodiment of a generic method for weighted bi-prediction 1500 is illustrated in FIG. 15. Such method is easily implemented in any one of motion compensation process of a method for video encoding or a method for video decoding by the skilled in the art wherein the obtaining of input information is determined in a RDO loop in an encoding method or decoded from received data in a decoder. According to the present principles, the weights of the weighted bi-prediction are dependent on the position of the sample in the block of a picture of the encoded or decoded video. Thus, processing of triangular partition is advantageously performed as a weighted prediction and results into an increased precision of the bi-prediction process of inter coded blocks as latter on explained.

First, at 1510 of FIG. 15, a first predictor and a second predictor are obtained for a block of a picture to be encoded/decoded. The first predictor for the block uses a first reference picture stored in a list L0 and the second predictor for the block uses a second reference picture stored in list L1. Those 2 uni-directional predictors are combined to form a third predictor by bi-directional inter prediction.

According to different embodiments described hereafter, at 1520 at least one information is obtained that is used in the determining of position dependents weights. This step is optional. According to non-limiting embodiments, a first information indicates the splitting of the block of the picture with a triangular partition, a second information indicates the direction of the edge the triangular partition of the block, a third information indicates the position of the edge of the triangular partition. According to another embodiment, the splitting of the block is not limited to triangular partition and more generic splitting of a block in 2 partitions along an edge as illustrated on FIG. 9. Then, an information used in the determining of position dependents weights is an information that indicates the splitting of the block of the picture with an edge partition. According to non-limiting embodiments, a fourth information indicates that an edge of the so-called "triangular partition" is vertical or horizontal (and not diagonal). According to another embodiment, an information used in the determining of position dependents weights is an information related to the color component. The number of samples in a block may be different if the block is a luma block or a chroma block, accordingly the weights are also determined according to the color component. Besides of that, the weights are also determined according to the size of the block. According to another embodiment, the position dependent weights in bi-prediction are not limited to triangle or edge partition, thus an information is more generally any information used in the determining of position dependents weights.

As previously described, in a particular embodiment, multiple weights are used for averaging 2 uni-directional prediction to get a bi-directional prediction. According to non-limiting example, the weights used are $\{-1/4, 5/4\}$, $\{3/8, 5/8\}$ or $\{1/2, 1/2\}$ where only one pair of weights is used for the entire block. The present principles are advantageously compatible with the selection of block-based weight among a set of weights, wherein the position dependent weight of a sample is derived from the selected block-based weight. In other words, the weight of a sample is determined according to the position of the sample and to the selected block-based weight of the predictor. Accordingly, at 1530, the selected block-based weight among a set of weights are optionally determined.

At 1540, the position dependent weight of a sample in the block is determined. According to particular embodiments, the position dependent weight of a sample in the block is further derived from at least one of the obtained information, the selected block-based weight, the component of the block, the size of the block. A sample of the third predictor is obtained by applying a first weight to a sample of the first predictor and by applying a second weight to a sample of the second predictor. Thus, the first and second weights are determined depending on the position of the sample in the block. The sample of the third predictor, the sample of the first predictor and the sample of the second predictor share a same position in the block, the samples are co-located in the block.

According to an embodiment, the position dependent weights bi-directional inter-prediction is used for triangular prediction. As each triangular prediction unit is restricted to uni-prediction, the triangular prediction is implemented as a bi-prediction wherein the first weight and second weight depends on the sample position. In the case of triangular partition, the first weight and the second weight depend on the distance between the sample and the edge of the triangular partition of the block. However, the present principles are not limited to triangle partitions and can be easily extended to other partitions of the block including horizontal/vertical edge and including multiple patterns. Different variants and refinements are described hereafter. The position of the edge in the block used to compute weights is obtained from the at least one information indicating the splitting of the block into 2 partitions. Besides, in a variant, the at least one information is signaled to allow a decoding method corresponding to the encoding method to use the same information for bi prediction. For instance, in an encoding method, the least one signaled information is entropy coded. For instance, in a decoding method, the least one information is obtained from entropy decoding of the signaled information.

However, the position dependent weights in bi-prediction are not limited to triangle or edge partition. For instance, the present principles are also compatible with avec Combined Inter-Intra Prediction wherein weights depend on sample location without other partition.

Once the sample dependent weights are obtained, at 1550, the bi-prediction process is processed. The third predictor, also referred to as the bi-directional predictor, is obtained as a weighted average of the first predictor and the second predictor. Advantageously, the weighted average is processed on an increased bit-depth compared to the bit-depth of the predictors. Then, at 1560, the weighted average on the larger bit-depth is shifted and clipped to obtain the third predictor on the same bit-depth as the first and second predictor.

At 1570, the bi prediction ends and the third predictor for the coded or decoded block of image is output.

Embodiment 1

Figure 7:
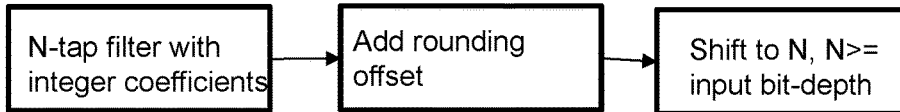
FIG. 7 illustrates an example of a modified motion compensation process adapted to triangular prediction according to an embodiment of the present disclosure.

At least one embodiment of the encoding or decoding method thus relates to the weighting of samples on the edge of a triangular partition with increased precision. FIG. 7 illustrates an example of a modified motion compensation process for triangular prediction according to an embodiment. As each triangular prediction unit is restricted to uni-prediction, a bi-prediction with sample position-dependent weighting factors is processed to obtain the triangular prediction. This modified motion compensation process in which the weight used for averaging 2 uni-prediction $P_1$ and $P_2$ may be different for each sample is implemented with the position dependent weights illustrated on FIGS. 3 and 4. The weight depends on the distance between the current sample $S_0$, $S_1$, $S_2$ or $S_3$ and the edge of between the 2 triangular Pus $P_1$ and $P_2$. For instance, the first weight $W_1$ is equal to 4/8 and second weight $W_2$ is equal to 4/8 for a sample $S_0$ on the edge of partition. For instance, the first weight $W_1$ is equal to 1/8 and second weight $W_2$ is equal to 7/8 for a sample $S_1$ distant from the edge of partition. Reversely, the first weight $W_1$ is equal to 7/8 and second weight $W_2$ is equal to 1/8 for a sample $S_2$ at the same distance from the edge of partition. And, the first weight $W_1$ is equal to 8/8 and second weight $W_2$ is equal to 0/8 when the distance between the sample $S_3$ and the edge of partition is above a defined value. As illustrated on FIG. 7, the shifting to input bitdepth and clipping are advantageously postponed after the weighting of the samples, thus beneficing of extended precision. In this embodiment, a first information indicating the splitting of the block of the picture with a triangular partition for instance according to the direction Top Left to Bottom Right as shown on FIG. 3. For instance, a dedicated syntax, such as triangle_flag, is used to indicate the triangle partitioning of the block. In a block of size N×N (for instance N=8 as on FIG. 3) of the luma component, the weight $W_1$ at a location (x,y), x and y in the range [0, N−1], in the block is for instance obtained by:

$$W_1 = (\text{Clip}(0,8,(x-y)+4) \text{ and } W_2 = 8-W_1$$

The resulting weights are in the range [0-8], thus, increased precision is obtained for the weighting sum and followed by shifting and clipping operation to reduce bit depth to the bit depth of the third predictor. As shown on FIG. 3, the weight $W_1$ at a location (x,y) is different for chroma component.

Embodiment 2

Figure 8:
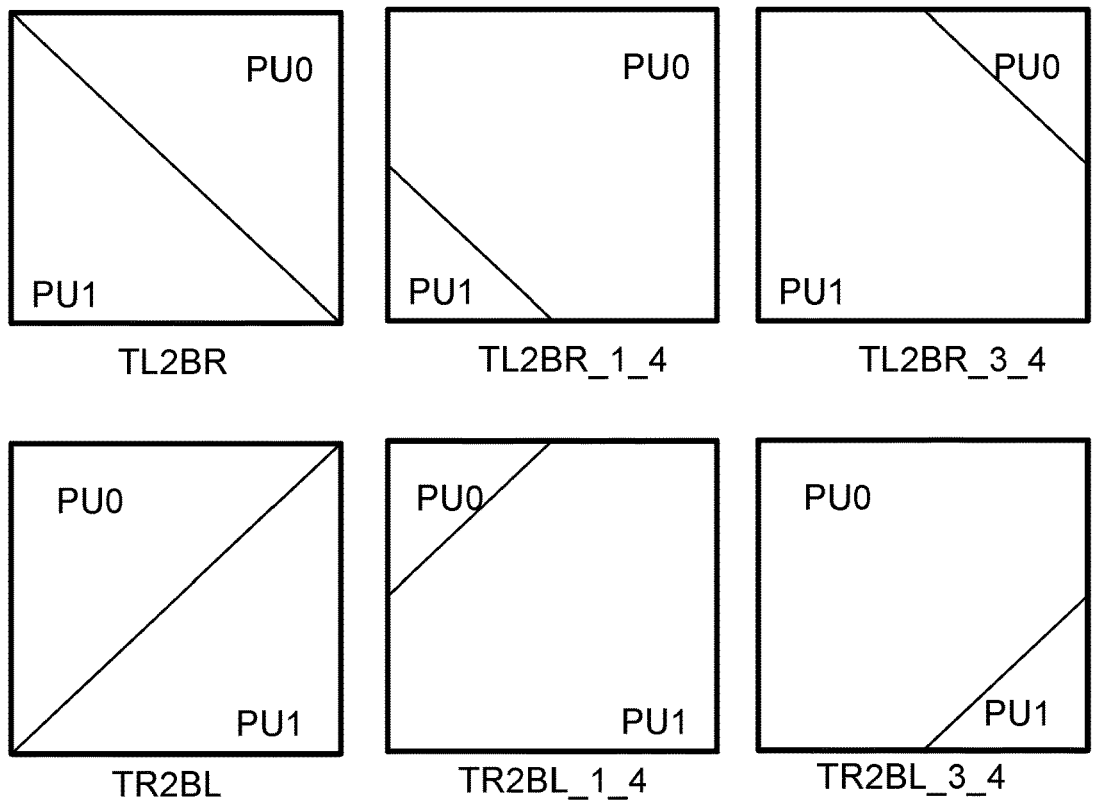
FIG. 8 illustrates examples of multiple diagonal patterns according to an embodiment of the present disclosure.

At least one embodiment of the encoding or decoding method further relates to the weighting of samples on the edge of a triangular partition adapted to multiple partition patterns. Advantageously, an information indicating the arrangement of the multiple partition patterns is used to determine the edge in the block of the different partition patterns. Thus, the position of the sample in the block with respect to the edge, for instance the distance, is determined. FIG. 8 illustrates examples of multiple diagonal patterns according to an embodiment. Such multiple diagonal patterns wherein 2 (TL2BR or TR2BL) or more (TL2BR_1_4, TL2BR_3_4, TR2BL_1_4, TR2BL_3_4) patterns are defined are desirable improve the coding efficiency. For instance, as shown on FIG. 8, the diagonal may be shifted (by 1/4 or 3/4) rotated (Top Left to Bottom Right TL2BR or Top Right to Bottom Left TR2BL).

At least one embodiment relates to bi-prediction with multiple partitions such as triangular partitions. According to a variant characteristic, the coding of the multiple patterns and the index for motion vectors predictors are separated. Indeed, if 6 patterns from FIG. 8 are implemented as bi-pred triangle partitions, 6*20=180 combinations would have to be tested at the encoder. Various encoder speed-up implementations are described below in variants of embodiment 5.

Accordingly, a dedicated syntax is described which separate the signaling of the pattern using the syntax element diagonal_dir[x0][y0], diagonal_pos[x0][y0] from the signaling of motion vector index in the motion vector candidate list most_probable_idx. Thus, the second information indicating the direction of the edge the triangular partition of the block is diagonal_dir[x0][y0] syntax element, and the third information indicating the position of the edge of the triangular partition is the diagonal_pos[x0][y0] syntax element. Such syntax elements are entropy coded, respectively decoded, and a binarization is proposed in tables 4 and 5.

TABLE 3

| Modified syntax for multiple patterns |
| --- |
| Descriptor |

```
prediction_unit( x0, y0, nPbW, nPbH ) {
    if( cu_skip_flag[ x0 ][ y0 ] ) {
        triangle_flag[ x0 ][ y0]
```

TABLE 3-continued

Modified syntax for multiple patterns

Figure 1:
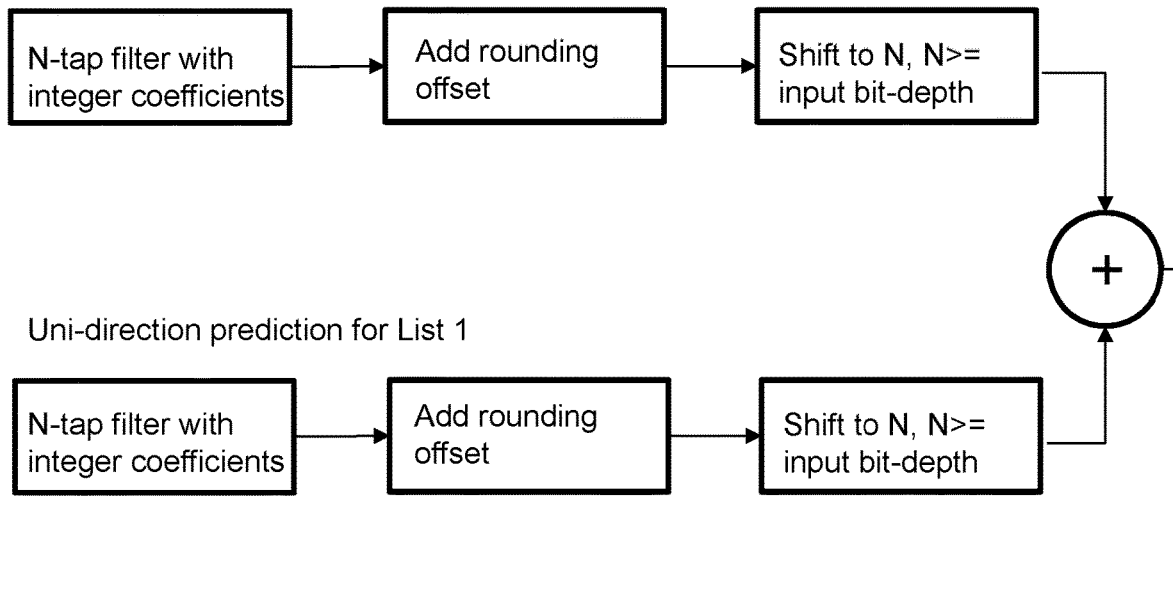
FIG. 1 illustrates bi-prediction process according to the HEVC standard.
Figure 2:
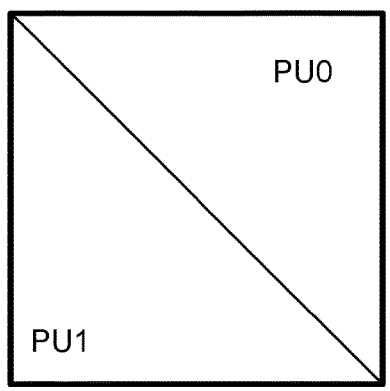
FIG. 2 illustrates the splitting of a coding unit CU into two triangular prediction units according to a particular compression scheme.
Figure 2:
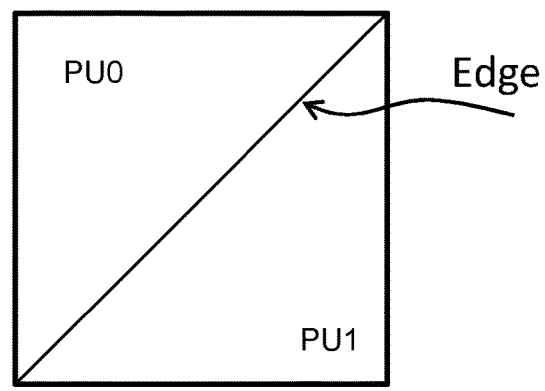

| | Descriptor |
|---|---|
|    if( MaxNumMergeCand > 1 ) { | |
|        if( triangle_flag[ x0 ][ y0 ] ) { | |
|            triangle_merge_data( x0, y0, nPbW, nPbH) | ae(v) |
|        } else { | |
|            merge_idx[ x0 ][ y0 ] | |
|        } | |
|    } | |
| } else { /* MODE_INTER */ | |
|    merge_flag[ x0 ][ y0 ] | ae(v) |
|    if( merge_flag[ x0 ][ y0 ] ) { | |
|        if( MaxNumMergeCand > 1 ) { | |
|            if( triangle_flag[ x0 ][ y0] ) { | |
|                triangle_merge_data( x0, y0, nPbW, nPbH) | |
|            } else { | |
|                merge_idx[ x0 ][ y0 ] | ae(v) |
|            } | |
|        } | |
|    } | |
| } | |
| triangle_merge_data( x0, y0, nPbW, nPbH) { | |
|    diagonal_dir[ x0 ][ y0 ] | u(1) |
|    diagonal_pos[ x0 ][ y0 ] | ae(v) |
|    most_probable_idx[ x0 ][ y0 ] | u(1) |
|    if( most_probable_idx[ x0 ][ y0 ] ) { | |
|        zero_or_one_idx[ x0 ][ y0 ] | u(1) |
|    } else { | |
|        remaining_idx[ x0 ][ y0 ] | se(v) |
|    } | |
| } | | diagonal_dir[x0][y0] specifies the direction of the diagonal that separate the 2 prediction units of the block where x0, y0 specify the location (x0, y0) of the top-left luma sample of the considered prediction block relative to the top-left luma sample of the picture. An example of various diagonal directions is illustrated on FIG. 2 and also FIG. 8.

TABLE 4

Binarization of diagonal_dir syntax element

| Value of diagonal_dir | Name of diagonal_dir | Bin string |
|---|---|---|
| 0 | TL2BR | 0 |
| 1 | TR2BL | 1 | diagonal_pos[x0][y0] specifies the position of the diagonal that separate the 2 prediction units of the block where x0, y0 specify the location (x0, y0) of the top-left luma sample of the considered prediction block relative to the top-left luma sample of the picture. An example of various diagonal positions is illustrated on FIG. 8.

TABLE 5

Binarization for diagonal_pos syntax element

| Value of diagonal_pos | Name of diagonal_pos | Bin string |
|---|---|---|
| 0 | TX2BX | 0 |
| 1 | TX2BX_1_4 | 10 |
| 2 | TX2BX_3_4 | 11 |

Embodiment 3

Figure 9:
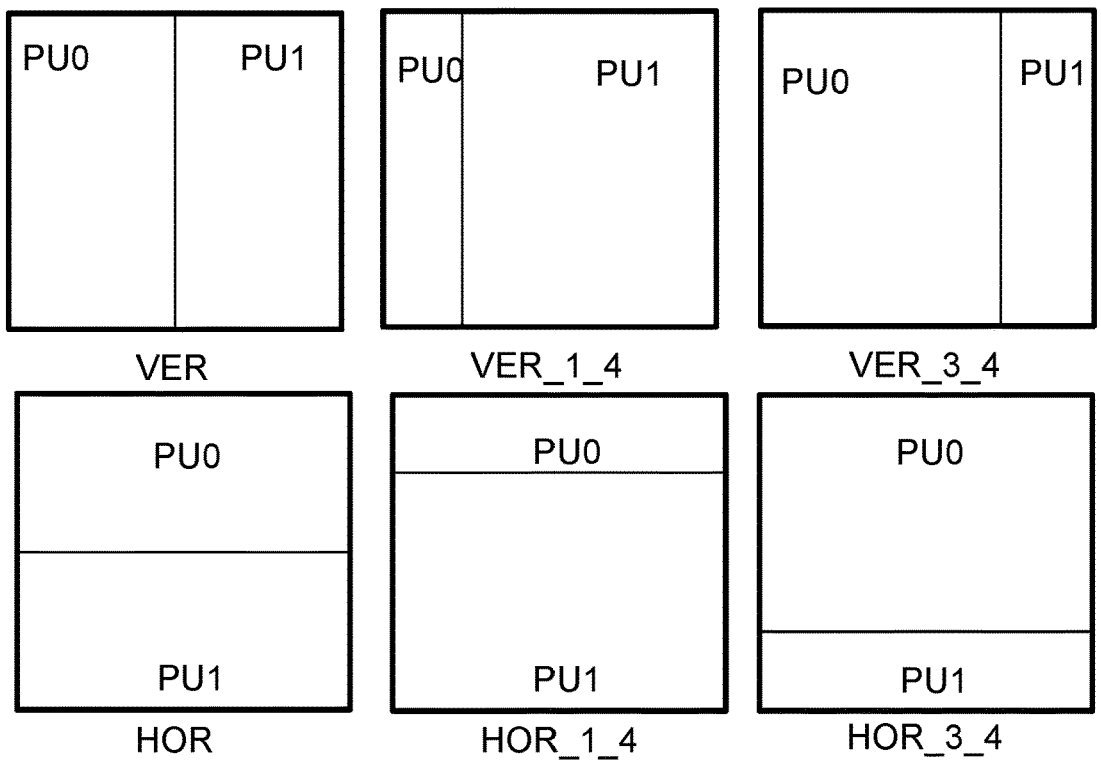
FIG. 9 and FIG. 10 illustrate other examples of multiple patterns according to an embodiment of the present disclosure.
Figure 10:
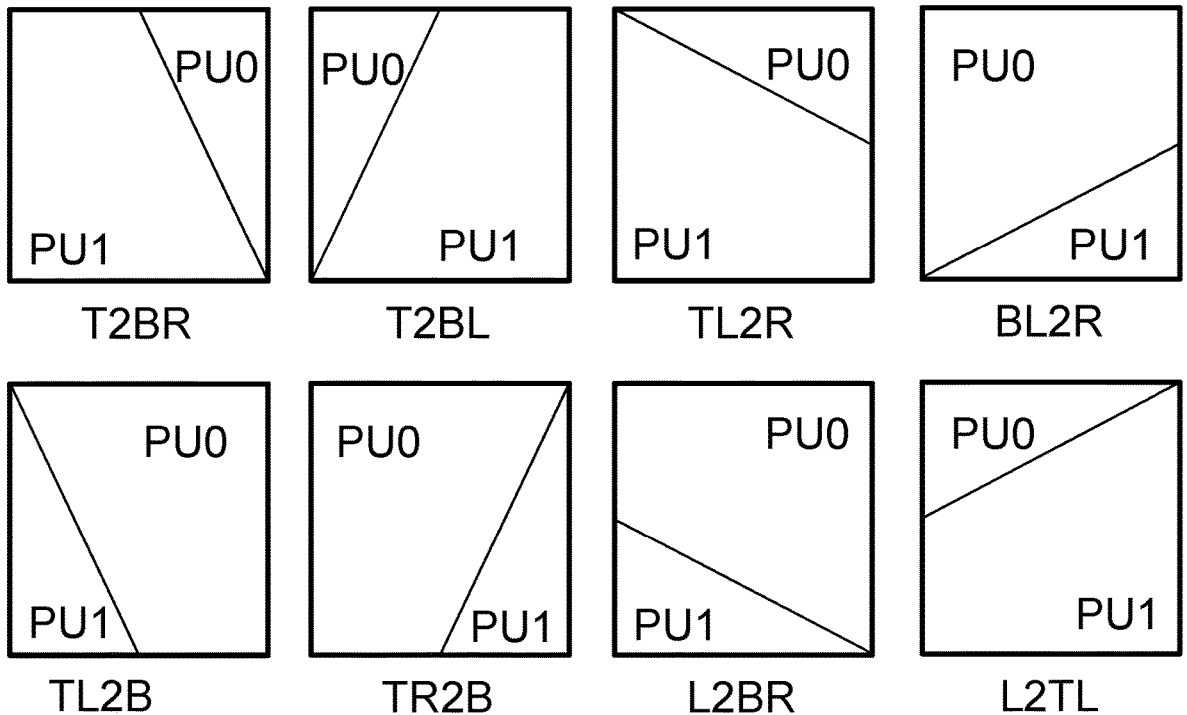

In yet another variant, other edges may be used as horizontal, vertical, or edges from corner to middle of a block as shown in FIGS. 9 and 10. For instance, FIG. 9 illustrates additional patterns where the edge is either horizontal (HOR, HOR_1_4, HOR_3_4) or vertical (VER, VER_1_4, VER_3_4), and located at the middle (HOR, VER) or at one fourth (HOR_1_4, HOR_3_4, VER_1_4, VER_3_4) of the block. FIG. 10 illustrates yet additional patterns where the edge starts at the corner and ends at the middle of a block. Of course, the partitions along an edge compatible with the present principles are not limited to the described patterns, and the skilled in the art will easily apply the modified motion compensation process using position dependent weighting factors to other partition patterns. According to the present embodiment, the syntax is modified to add the new patterns as shown in Table 6.

TABLE 6

Proposed syntax for diagonal plus horizontal and vertical partitions

| | |
|---|---|
| triangle_merge_data( x0, y0, nPbW, nPbH) { | |
|    diagonal_flag[ x0 ][ y0 ] | u(1) |
|    partition_dir[ x0 ][ y0 ] | u(1) |
|    partition_pos[ x0 ][ y0 ] | ae(v) |
|    most_probable_idx[ x0 ][ y0 ] | u(1) |
|    if( most_probable_idx[ x0 ][ y0 ] ) { | |
|        zero_or_one_idx[ x0 ][ y0 ] | u(1) |
|    } else { | |
|        remaining_idx[ x0 ][ y0 ] | se(v) |
|    } | |
| } | |

In another variant, a syntax element is coded that indicate other weights to apply for the averaging on the edge.

Embodiment 4

Figure 11:
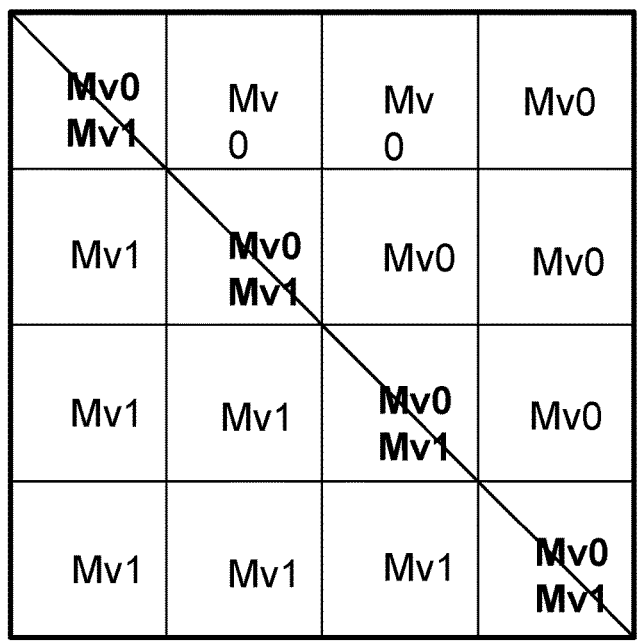
FIG. 11 illustrates an embodiment of a proposed motion vector storage.

The at least one embodiment is further well adapted to storage of motion vectors on the edge of the partition. In classical inter modes, when bi-prediction is used, 2 motion vectors (1 for each list) is stored in 4×4 sub-blocks. In Triangle mode merge, in the variant where each PU is restricted to uni-prediction, the 2 motion vectors used on the edge as shown in FIG. 11, are advantageously stored in the respective 2 lists. Thus, the method is implemented at no extra cost. In combination with Equation 2, motion vectors may be stored with given weights w0 and w1 for respectively motion vectors from List 0 and List 1. This allow a better propagation of motion vectors hence a better prediction for the neighboring blocks.

Variants of Embodiment 5

Embodiment 5 relates to encoder speed-ups for motion compensation. At the encoder, the maximum number of tested combinations increases a lot when using more patterns, as for a given pattern, 20 combinations of motion vector predictors are used. For any combination, the averaging is processed in order to evaluate the candidate. At least one embodiment relates to reducing the number of tested combinations. According to a characteristic, by using a fast estimation with SATD (Sum of Absolute Transformed Differences), RDOQ (Rate Distortion optimized Quantization) process is done only for the best predictors.

In a first variant, the combinations that use a zero motion vector predictor added at the end of the list are not tested. For example if predictors 4 and 5 of the list are the added zero motion vectors, only 3*2=6 combination for a given pattern are tested instead of 20. In the case of 6 patterns 6*6=36 combinations are tested instead of 6*20=240.

In a second variant, the combinations that use motion vector selected in the classical merge are tested, the other combinations are not tested. First, the best merge candidate for the classical merge is determined. One or 2 motion vector(s) depending if the best candidate is uni-directional or bi-directional are then recovered. If these motion vectors are in the list of motion vector predictors for Triangular PUs, then the test of possible combinations is reduced to the test of combinations that contains these motion vector predictors.

In a third variant, motion vector predictors are ranked with SAD or SATD. As all the combination are done using a maximum of 5 motion vector predictors, all 5 uni-directional motion vector predictors are ranked according their likelihood using SAD or SATD. The N (with N<5) bests motion vectors are kept or predictors superior to a threshold are removed. Thus, the number of possible combinations is reduced.

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all the different aspects can be combined and interchanged to provide further aspects. Moreover, the aspects can be combined and interchanged with aspects described in earlier filings as well.

Figure 12:
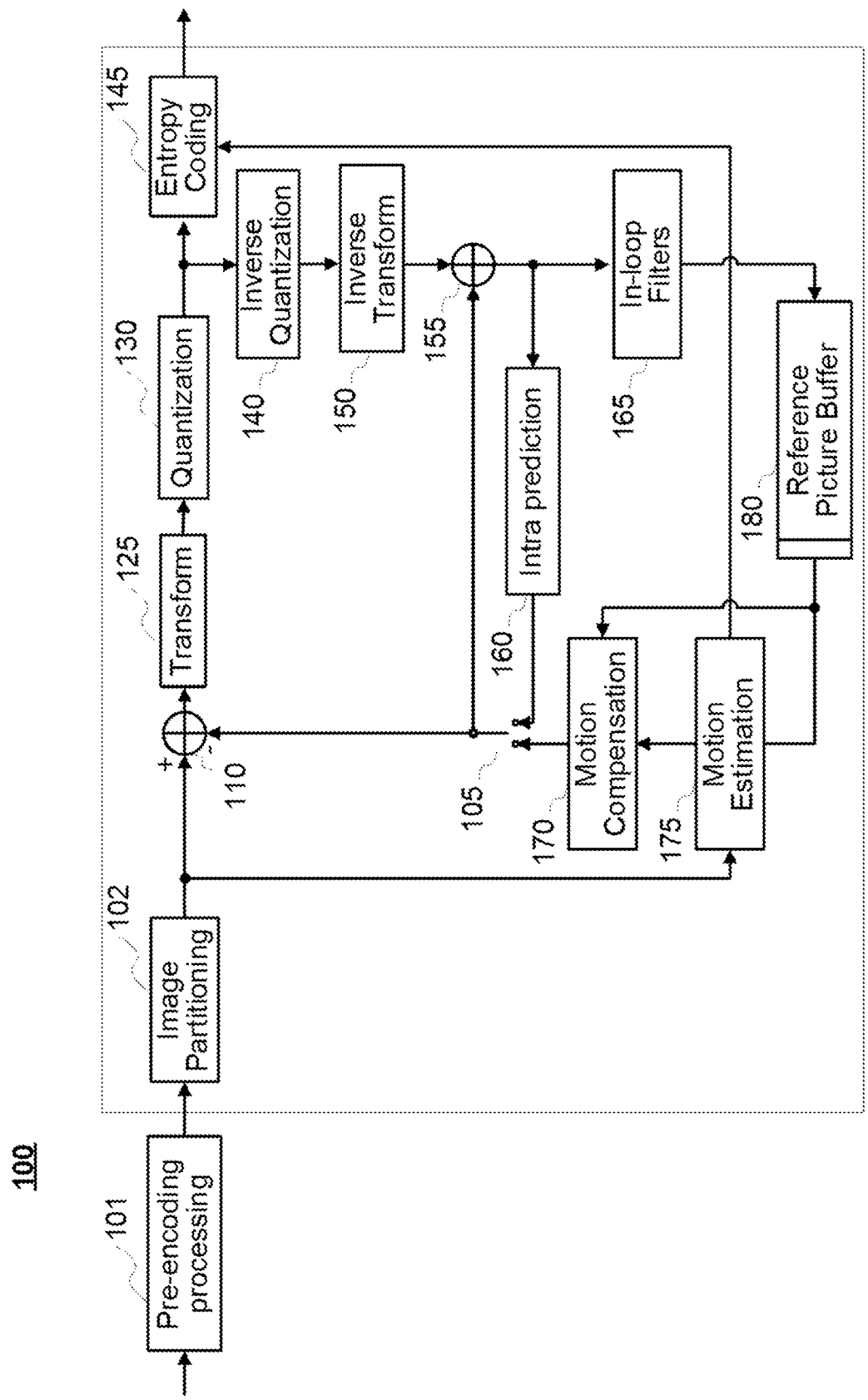
FIG. 12 illustrates an exemplary encoder according to an embodiment of the present disclosure.
Figure 13:
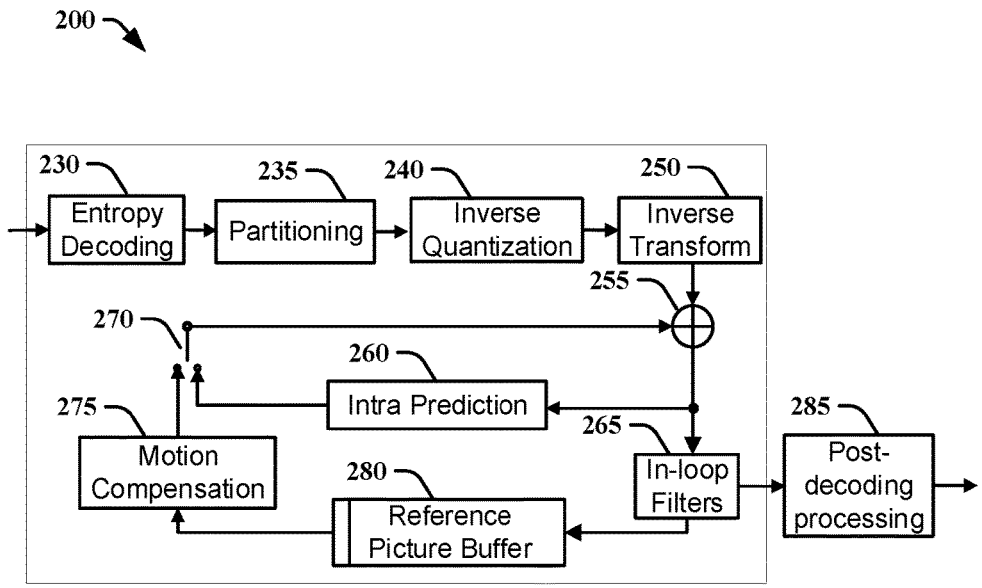
FIG. 13 illustrates an exemplary decoder according to an embodiment of the present disclosure.
Figure 14:
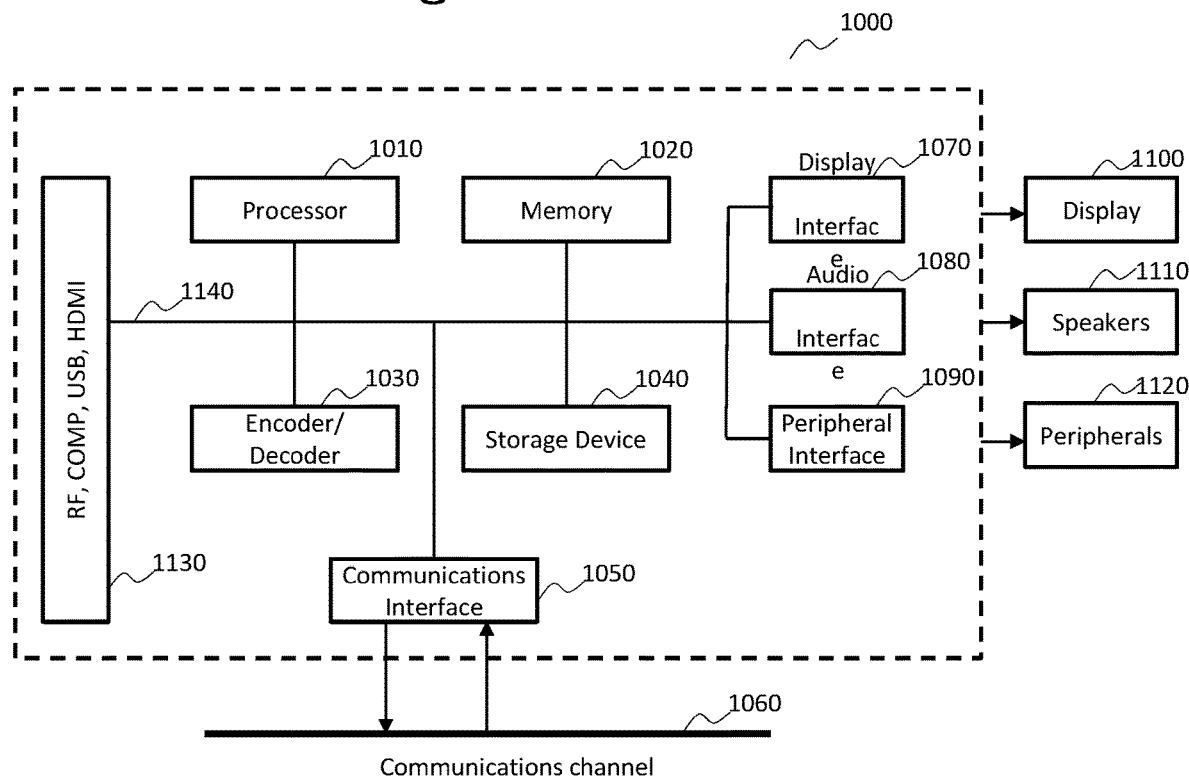
FIG. 14 illustrates a block diagram of an example of a system, in which various aspects and embodiments are implemented.

The aspects described and contemplated in this application can be implemented in many different forms. FIGS. 12, 13 and 14 below provide some embodiments, but other embodiments are contemplated and the discussion of FIGS. 12, 13 and 14 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the entropy coding 145, motion compensation 170 and motion estimation 175 of a video encoder 100 as shown in FIG. 12 and entropy decoding 230 and motion compensation 275 modules of a video decoder 200 FIG. 13. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of partitions or the value of the relative weights. The specific values are for example purposes and the aspects described are not limited to these specific values.

FIG. 12 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 13 illustrates a block diagram of a video decoder 200. In the decoder 200, a bitstream is decoded by the decoder elements as described below. Video decoder 200 generally performs a decoding pass reciprocal to the encoding pass as described in FIG. 13. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 14 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decoding a bi-prediction flag, decoding a partition for bi-prediction and index in a predictor list, determining a weight according to the position of the pixel in the block, in particular along the edge of a partition of the PU and performing motion compensation in inter using bi-prediction and determined weight.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining a predictor in a bi-prediction scheme using motion compensation and motion prediction, wherein the weight of the bi-prediction is based on the position of the pixel in the block, in particular along the edge of a partition of the PU and performing motion compensation in inter using bi-prediction and, encoding a bi-prediction flag, encoding a partition for bi-prediction and encoding index in a predictor list.

As further examples, in one embodiment "encoding" refers only to entropy encoding, in another embodiment "encoding" refers only to differential encoding, and in another embodiment "encoding" refers to a combination of differential encoding and entropy encoding.

Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, diagonal_dir, diagonal_pos, diagonal_flag, partition_dir, partition_pos, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization for instance when testing combinations for the bi-pred multiple partition PUs at the encoder. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for improved bi-prediction, for instance for signaling the partition of a block and associated weight. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

- Modifying the bi-prediction process applied in the decoder and/or encoder.
- Applying bi-prediction methods with increased precision in the decoder and/or encoder.
- Enabling several weights in a same PU for bi-prediction methods in the decoder and/or encoder.
- Determining weights in a PU for bi-prediction methods according to the position of the pixel with regard to the edge of a partition of the PU in the decoder and/or encoder.
- Determining weights in a PU for bi-prediction methods according to the position of the pixel with regard to the edge of multiples partitions of the PU in the decoder and/or encoder.
- Inserting in the signaling, syntax elements that enable the decoder to identify the PU partition for bi-prediction method to use, and optionally the weight for each pixels.
- Selecting, based on these syntax elements, the partition and the weights for the bi-prediction method to apply at the decoder.
- Using uni-prediction motion model to combine them into weighted bi-prediction at encoder and/or decoder according to any of the embodiments discussed.
- A bitstream or signal that includes one or more of the described syntax elements, or variations thereof.
- Inserting in the signaling syntax elements that enable the decoder to perform motion compensation in a manner corresponding to that used by an encoder.
- Creating and/or transmitting and/or receiving and/or decoding a bitstream or signal that includes one or more of the described syntax elements, or variations thereof.

A TV, set-top box, cell phone, tablet, or other electronic device that performs bi-prediction in Inter according to any of the embodiments described.

A TV, set-top box, cell phone, tablet, or other electronic device that bi-prediction in Inter according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs bi-prediction in Inter according to any of the embodiments described.

A TV, set-top box, cell phone, tablet, or other electronic device that receives (e.g. using an antenna) a signal over the air that includes an encoded image, and performs bi-prediction in Inter parameters according to any of the embodiments described.

The invention claimed is:

1. A method, comprising:
obtaining a first information indicating a splitting of a block of a picture with a geometric partition;
obtaining, from uni-prediction, a first predictor for the block of the picture using a first reference picture, wherein a bit depth of the first predictor after uni-prediction is larger than a processing bit depth;
obtaining, from uni-prediction, a second predictor for the block of the picture using a second reference picture, wherein a bit depth of the second predictor after uni-prediction is larger than the processing bit depth;
obtaining a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtaining a third predictor for the block by shifting and clipping the weighted average to the processing bit depth wherein the shifting compensates for the bit depth increase of both the weighted average and the uni-prediction of the first and second predictors; and
decoding the block of the picture using the third predictor generated by a geometric partition mode.

2. The method of claim 1, wherein the first weight and the second weight are in a range [0-8] and wherein the bit depth of the weighted average is larger than or equal to the processing bit depth plus 5.

3. The method of claim 1, wherein the first weight and the second weight depend on a distance between the sample and an edge of the geometric partition of the block.

4. The method of claim 1, wherein the block of the picture comprises a luma component and two chroma components and wherein the first weight and the second weight further depend on the luma component or chroma component.

5. An apparatus, comprising:
one or more processors, wherein the one or more processors are configured to:
obtain a first information indicating a splitting of a block of a picture with a geometric partition;
obtain, from uni-prediction, a first predictor for the block of the picture using a first reference picture, wherein a bit depth of the first predictor after uni-prediction is larger than a processing bit depth;
obtain, from uni-prediction, a second predictor for the block of the picture using a second reference picture, wherein a bit depth of the second predictor after uni-prediction is larger than the processing bit depth;
obtain a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtain a third predictor for the block by shifting and clipping the weighted average to the processing bit depth wherein the shifting compensates for the bit depth increase of both the weighted average and the uni-prediction of the first and second predictors; and
decode the block of the picture using the third predictor generated by a geometric partition mode.

6. The apparatus of claim 5, wherein the first weight and the second weight are in a range [0-8] and wherein the bit depth of the weighted average is larger than or equal to the processing bit depth plus 5.

7. The apparatus of claim 5, wherein the first weight and the second weight depend on a distance between the sample and an edge of the geometric partition of the block.

8. The apparatus of claim 5, wherein the block of the picture comprises a luma component and two chroma components and wherein the first weight and the second weight further depend on the luma component or chroma component.

9. A method, comprising:
obtaining a first information indicating a splitting of a block of a picture with a geometric partition;
obtaining, from uni-prediction, a first predictor for the block of the picture using a first reference picture, wherein a bit depth of the first predictor after uni-prediction is larger than a processing bit depth;
obtaining, from uni-prediction, a second predictor for the block of the picture using a second reference picture, wherein a bit depth of the second predictor after uni-prediction is larger than the processing bit depth;
obtaining a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtaining a third predictor for the block by shifting and clipping the weighted average to the processing bit depth wherein the shifting compensates for the bit depth increase of both the weighted average and the uni-prediction of the first and second predictors; and
encoding the block of the picture using the third predictor generated by a geometric partition mode.

10. The method of claim 9, wherein the first weight and the second weight are in a range [0-8] and wherein the bit depth of the weighted average is larger than or equal to the processing bit depth plus 5.

11. The method of claim 9, wherein the first weight and the second weight depend on a distance between the sample and an edge of the geometric partition of the block.

12. The method of claim 9, wherein the block of the picture comprises a luma component and two chroma components and wherein the first weight and the second weight further depend on the luma component or chroma component.

13. An apparatus, comprising:
one or more processors, wherein the one or more processors are configured to:
obtain a first information indicating a splitting of a block of a picture with a geometric partition;
obtain, from uni-prediction, a first predictor for the block of the picture using a first reference picture, wherein a bit depth of the first predictor after uni-prediction is larger than a processing bit depth;
obtain, from uni-prediction, a second predictor for the block of the picture using a second reference picture, wherein a bit depth of the second predictor after uni-prediction is larger than the processing bit depth;
obtain a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtain a third predictor for the block by shifting and clipping the weighted average to the processing bit depth wherein the shifting compensates for the bit depth increase of both the weighted average and the uni-prediction of the first and second predictors; and
encode the block of the picture using the third predictor generated by a geometric partition mode.

14. The apparatus of claim 13, wherein the first weight and the second weight are in a range [0-8] and wherein the bit depth of the weighted average is larger than or equal to the processing bit depth plus 5.

15. The apparatus of claim 13, wherein the first weight and the second weight depend on a distance between the sample and an edge of the geometric partition of the block.

16. The apparatus of claim 13, wherein the block of the picture comprises a luma component and two chroma components and wherein the first weight and the second weight further depend on the luma component or chroma component.

17. A non-transitory computer readable medium containing encoded data representative of a block of a picture of a video, the encoded data being formed by performing:
obtaining a first information indicating a splitting of the block of the picture with a geometric partition;
obtaining, from uni-prediction, a first predictor for the block of the picture using a first reference picture, wherein a bit depth of the first predictor after uni-prediction is larger than a processing bit depth;
obtaining, from uni-prediction, a second predictor for the block of the picture using a second reference picture, wherein a bit depth of the second predictor after uni-prediction is larger than the processing bit depth;
obtaining a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtaining a third predictor for the block by shifting and clipping the weighted average to the processing bit depth wherein the shifting compensates for the bit depth increase of both the weighted average and the uni-prediction of the first and second predictors; and
encoding the block of the picture using the third predictor generated by a geometric partition mode.

18. A non-transitory program storage device, readable by a computer, tangibly embodying a program of instructions executable by the computer for performing the method according to claim 1.

19. A method for transmitting encoded data representative of a block of a picture of a video, the method comprising transmitting encoded data formed by:
obtaining a first information indicating a splitting of the block of the picture with a geometric partition;
obtaining, from uni-prediction, a first predictor for the block of the picture using a first reference picture, wherein a bit depth of the first predictor after uni-prediction is larger than a processing bit depth;
obtaining, from uni-prediction, a second predictor for the block of the picture using a second reference picture, wherein a bit depth of the second predictor after uni-prediction is larger than the processing bit depth;
obtaining a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtaining a third predictor for the block by shifting and clipping the weighted average to the processing bit depth wherein the shifting compensates for the bit depth increase of both the weighted average and the uni-prediction of the first and second predictors; and
encoding the block of the picture using the third predictor generated by a geometric partition mode.

20. An apparatus for transmitting encoded data representative of a block of a picture of a video comprising a memory and one or more processors configured to transmit encoded data formed by:
obtaining a first information indicating a splitting of the block of the picture with a geometric partition;
obtaining, from uni-prediction, a first predictor for the block of the picture using a first reference picture, wherein a bit depth of the first predictor after uni-prediction is larger than a processing bit depth;
obtaining, from uni-prediction, a second predictor for the block of the picture using a second reference picture, wherein a bit depth of the first predictor after uni-prediction is larger than a processing bit depth;
obtaining a weighted average of the first predictor and the second predictor;
wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;
obtaining a third predictor for the block by shifting and clipping the weighted average to the processing bit depth wherein the shifting compensates for the bit depth increase of both the weighted average and the uni-prediction of the first and second predictors; and encoding the block of the picture using the third predictor generated by a geometric partition mode.

21. A method for receiving encoded data representative of a block of a picture of a video, the method comprising receiving encoded data formed by:

obtaining a first information indicating a splitting of the block of the picture with a geometric partition;

obtaining, from uni-prediction, a first predictor for the block of the picture using a first reference picture, wherein a bit depth of the first predictor after uni-prediction is larger than a processing bit depth;

obtaining, from uni-prediction, a second predictor for the block of the picture using a second reference picture, wherein a bit depth of the second predictor after uni-prediction is larger than the processing bit depth;

obtaining a weighted average of the first predictor and the second predictor;

wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;

obtaining a third predictor for the block by shifting and clipping the weighted average to the processing bit depth wherein the shifting compensates for the bit depth increase of both the weighted average and the uni-prediction of the first and second predictors; and encoding the block of the picture using the third predictor generated by a geometric partition mode.

22. An apparatus for receiving encoded data representative of a block of a picture of a video comprising a memory and one or more processors configured to receive encoded data formed by:

obtaining a first information indicating a splitting of the block of the picture with a geometric partition;

obtaining, from uni-prediction, a first predictor for the block of the picture using a first reference picture, wherein a bit depth of the first predictor after uni-prediction is larger than a processing bit depth;

obtaining, from uni-prediction, a second predictor for the block of the picture using a second reference picture, wherein a bit depth of the second predictor after uni-prediction is larger than a processing bit depth;

obtaining a weighted average of the first predictor and the second predictor;

wherein a sample of the weighted average is obtained by applying a first weight to a sample of the first predictor and by applying a second weight to a co-located sample of the second predictor, wherein the first weight and the second weight are responsive to the first information and wherein a bit depth of the weighted average is larger than the processing bit depth;

obtaining a third predictor for the block by shifting and clipping the weighted average to the processing bit depth wherein the shifting compensates for the bit depth increase of both the weighted average and the uni-prediction of the first and second predictors; and encoding the block of the picture using the third predictor generated by a geometric partition mode.

23. The method of claim 1, wherein the first weight and the second weight are in a range [0-8] and wherein the shifting to the processing bit depth is larger than or equal to 5.

24. The apparatus of claim 5, wherein the first weight and the second weight are in a range [0-8] and wherein the shifting to the processing bit depth is larger than or equal to 5.

25. The method of claim 9, wherein the first weight and the second weight are in a range [0-8] and wherein the shifting to the processing bit depth is larger than or equal to 5.

26. The apparatus of claim 13, wherein the first weight and the second weight are in a range [0-8] and wherein the shifting to the processing bit depth is larger than or equal to 5.

* * * * *